United States Patent
Zhang et al.

(10) Patent No.: US 11,432,291 B2
(45) Date of Patent: Aug. 30, 2022

(54) SYSTEM AND SCHEME ON GROUP BASED IDENTITY AND SCRAMBLING FOR UE COOPERATION TRANSMISSION

(71) Applicants: Liqing Zhang, Ottawa (CA); Jianglei Ma, Ottawa (CA); Hua Xu, Ottawa (CA)

(72) Inventors: Liqing Zhang, Ottawa (CA); Jianglei Ma, Ottawa (CA); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 16/906,334

(22) Filed: Jun. 19, 2020

(65) Prior Publication Data
US 2020/0404663 A1    Dec. 24, 2020

Related U.S. Application Data

(60) Provisional application No. 62/864,823, filed on Jun. 21, 2019.

(51) Int. Cl.
*H04W 72/04* (2009.01)
*H04W 76/11* (2018.01)
(Continued)

(52) U.S. Cl.
CPC ... *H04W 72/0466* (2013.01); *H04W 72/0406* (2013.01); *H04W 76/11* (2018.02);
(Continued)

(58) Field of Classification Search
CPC . H04W 72/0466; H04W 76/14; H04W 76/11; H04W 76/40; H04W 72/0406;
(Continued)

(56) References Cited

U.S. PATENT DOCUMENTS

2016/0073366 A1* 3/2016 Ng ................... H04W 16/14
                                                      370/329
2016/0234045 A1* 8/2016 Lindoff .......... H04L 25/03866
(Continued)

FOREIGN PATENT DOCUMENTS

CN        109217989 A       1/2019
CN        109547947 A       3/2019
(Continued)

OTHER PUBLICATIONS

Huawei, HiSilicon, sidelink Support and Enhancements for NR. 3GPP TSG RAN WG1 Meeting #86, Gothenburg, Sweden, Aug. 22-26, 2016 R1-167207. (Year: 2016).*
(Continued)

*Primary Examiner* — Ayaz R Sheikh
*Assistant Examiner* — Louis Samara

(57) ABSTRACT

Systems and methods are provided to achieve data scrambling and transmission identification in the SL for UE cooperation (UC), in which one or more cooperating UEs help with a transmission to a target UE. Corresponding configuration schemes are also provided. In addition, systems and methods are provided to achieve data DMRS sequence generation and transmission identification in SL for UC, in which one or more cooperating UEs help with a transmission to a target UE. Corresponding configuration schemes are also provided. Furthermore, systems and methods of SL control channel scrambling and identification for UE cooperation are provided.

22 Claims, 10 Drawing Sheets

(51) Int. Cl.
*H04W 76/14* (2018.01)
*H04W 76/40* (2018.01)
*H04W 92/18* (2009.01)
*H04W 88/04* (2009.01)

(52) U.S. Cl.
CPC .......... *H04W 76/14* (2018.02); *H04W 76/40* (2018.02); *H04W 88/04* (2013.01); *H04W 92/18* (2013.01)

(58) Field of Classification Search
CPC ....... H04W 88/04; H04W 92/18; H04W 4/80; H04W 72/042; H04W 4/70; H04W 76/10; H04L 51/02; H04L 25/03866; H04L 5/0053; H04B 1/713
See application file for complete search history.

(56) References Cited

U.S. PATENT DOCUMENTS

| | | | |
|---|---|---|---|
| 2017/0048829 A1* | 2/2017 | Kim | H04L 5/0053 |
| 2017/0171690 A1* | 6/2017 | Kim | H04W 4/70 |
| 2017/0257898 A1 | 9/2017 | Maaref | |
| 2018/0145805 A1* | 5/2018 | Maaref | H04W 72/1289 |
| 2019/0174327 A1* | 6/2019 | You | H04W 72/042 |
| 2019/0380159 A1* | 12/2019 | Bangolae | H04W 88/04 |
| 2020/0137782 A1* | 4/2020 | Su | H04W 72/042 |
| 2021/0105821 A1* | 4/2021 | Niu | H04W 74/0833 |
| 2022/0015160 A1* | 1/2022 | Xu | H04W 76/10 |

FOREIGN PATENT DOCUMENTS

| | | |
|---|---|---|
| WO | 2015117567 A1 | 8/2015 |
| WO | 2017198178 A1 | 11/2017 |
| WO | 2018113564 A1 | 6/2018 |
| WO | 2018204629 A1 | 11/2018 |
| WO | 2019019822 A1 | 1/2019 |
| WO | WO-2020237437 A1 * | 12/2020 ........... H04L 1/1812 |

OTHER PUBLICATIONS

IEEE, "Energy- and Spectral-Efficiency Adaptive Forwarding Strategy for Multi-Hope Device-to-Device Communications Overlaying Cellular Networks", vol. 17, No. 9, Sep. 2018 (Year: 2018).*
ZTE, Sanechips, Support of unicast, groupcast and broadcast in NR V2X. 3GPP TSG RAN WG1 Meeting #95, Spokane, USA, Nov. 12-16, 2018, R1-1812730, 6 pages.
Huawei, HiSilicon, Sidelink Support and Enhancements for NR 3GPP TSG RAN WG1 Meeting #86, Gothenburg, Sweden, Aug. 22-26, 2016, R1-167207, 7 pages.
3rd Generation Partnership Project; Technical Specification Group Radio Access Network; NR; Physical channels and modulation (Release 15), 3GPP TS 38.211 V15.5.0 (Mar. 2019); Sophia Antipolis, Valbonne—France, 96 pages.
3rd Generation Partnership Project; Technical Specification Group Radio Access Network; NR; Multiplexing and channel coding (Release 15), 3GPP TS 38.212 V15.5.0 (Mar. 2019), Sophia Antipolis, Valbonne—France, 101 pages.
3rd Generation Partnership Project; Technical Specification Group Radio Access Network; NR; Radio Resource Control (RRC) protocol specification (Release 15), 3GPP TS 38.331 V15.5.1 (Apr. 2019), Sophia Antipolis, Valbonne—France, 491 pages.
Final Report of 3GPP TSG RAN WG1 #94bis v1.0.0 (Chengdu, China, Oct. 8-12, 2018), 3GPP TSG RAN WG1 Meeting #95, R1-1812101, Spokane, USA, Nov. 12-16, 2018, 197 pages.
R1-1903156, Convida Wireless, On Sidelink Resource Allocation, 3GPP TSG-RAN WG1 Meeting #96, Athens, Greece, Feb. 24-Mar. 1, 2019, total 3 pages. XP051600852.

* cited by examiner

Group based data scrambling

Data scrambling for unicast

SCI CRC scrambled by a group ID

SCI scrambling by a group ID & a group based scrambling ID

SYSTEM AND SCHEME ON GROUP BASED IDENTITY AND SCRAMBLING FOR UE COOPERATION TRANSMISSION

CROSS REFERENCE TO RELATED APPLICATION

This application claims the benefit of U.S. Provisional Patent Application No. 62/864,823 filed Jun. 21, 2019, which is hereby incorporated by reference.

FIELD

The application relates to methods and apparatus for sidelink transmission using scrambling sequences.

BACKGROUND

In current New Radio (NR) systems, transmission identification and scrambling are user equipment (UE) specific in support of UE data transmission on the link between a gNodeB (gNB) and a UE, also referred to as the Uu link. Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and UE, such as uplink (UL) and downlink (DL), also referred to as Uu link, and using a sidelink between UE and UE (SL). UE cooperation can be used to enhance the reliability, throughput, and capacity of V2X communications, as well as next generation wireless communications in general.

However, the existing approach of UE specific scrambling and transmission identification is not appropriate for sidelink transmissions, because for security reasons, it is undesirable to share a UE identifier with most other UEs.

SUMMARY

Systems and methods are provided to achieve data scrambling and transmission identification in the SL for UE cooperation (UC), in which one or more cooperating UEs help with a transmission to a target UE. Corresponding configuration schemes are also provided. In addition, systems and methods are provided to achieve data DMRS sequence generation and transmission identification in SL for UC, in which one or more cooperating UEs help with a transmission to a target UE. Corresponding configuration schemes are also provided. Furthermore, systems and methods of SL control channel scrambling and identification for UE cooperation are provided.

According to one aspect of the present disclosure, there is provided a method in a UE comprising acting as a cooperating UE (CUE) to assist at least one target UE (TUE) by: receiving a signal from a base station carrying a first modulated scrambled data block; demodulating, de-scrambling and decoding the first modulated scrambled data block to produce a decoded data block; determining that the decoded data block is for said at least one TUE; encoding the decoded data block to produce an encoded data block, and scrambling the encoded data block based on at least a group ID to produce a scrambled data block; modulating the scrambled data block to produce a second modulated scrambled data block; transmitting the second modulated scrambled data block for reception by the at least one TUE.

Optionally, the group ID is known by the UE and the at least one target UE (TUE).

Optionally, the group ID is a function of one or more of: UE cooperation (UC) group ID, TUE sub-group ID, TUE PHY identity, TUE medium access control (MAC) ID, TUE higher-layer ID, CUE sub-group ID, CUE PHY identity, CUE MAC ID, CUE higher-layer ID, cell ID.

Optionally, one or more of the following parameters is (or are) predefined, semi-statically configured by higher layer signaling, or dynamically configured by PHY layer signaling: UE cooperation (UC) group ID, TUE sub-group ID, TUE PHY identity, TUE medium access control (MAC) ID, TUE higher-layer ID, CUE sub-group ID, CUE PHY identity, CUE MAC ID, CUE higher-layer ID, cell ID.

Optionally, the transmitting is a unicast transmission to one TUE, wherein the one TUE is indicated or identified by a TUE sub-group ID or a combination of a UE cooperation (UC) group ID and the TUE sub-group ID.

Optionally, the transmitting is a unicast transmission to one TUE, wherein the one TUE is indicated or identified by a DMRS sequence.

Optionally, the DMRS sequence is generated based on at least a group ID associated with the unicast transmission.

Optionally, the scrambling is also based on a group based data scrambling ID.

Optionally, the group based scrambling ID is: based on a configuration of the group based data scrambling ID received via higher layer signalling; or based on a cell ID.

In some embodiments, the method further comprises: for unicast transmission to a single TUE, the group ID comprises a UE cooperation group ID (UC group ID) common to all members of a UC group combined with a TUE sub-group ID; for multicast transmission to a group of TUEs, the group ID comprises a UE cooperation group ID (UC group ID) common to all members of a UC group.

In some embodiments, the method further comprises: receiving signaling to configure the UE to assist the at least one TUE.

Optionally, the method further involves transmitting sidelink control information (SCI) signaling indicating transmission resources and parameters for use by the at least one TUE in detecting and decoding second modulated scrambled data block.

Optionally, transmitting SCI signaling is performed using a group-cast transmission to one or more UEs in a group of UEs identified by the group ID or a unicast transmission to one TUE.

Optionally, transmitting sidelink control information (SCI) signaling further comprises:
scrambling a CRC of a set of sidelink control information (SCI) information bits based on at least the group ID, the SCI information bits and the scrambled CRC together forming an SCI coded block;
scrambling the SCI coded block based on at least the group ID to produce a scrambled SCI coded block;
modulating the scrambled SCI coded block to produce a modulated SCI coded block;
transmitting the modulated SCI coded block for reception by the at least one TUE;
wherein the group ID is known by the CUE and the at least one target UE (TUE).

Optionally, determining that the decoded data block is for said at least one TUE comprises attempting to descramble the scrambled data block with a scrambling sequence specific to the CUE, and also with the scrambling sequence based on the group ID.

Optionally, the first modulated scrambled data block is scrambled with a different scrambling sequence than the second modulated scrambled data block.

Optionally, the first modulated scrambled data block is modulated with a different modulation and coding scheme than the second modulated scrambled data block.

According to another aspect of the present disclosure, there is provided a method in a UE, or a method according to any preceding claim, the method comprising acting as a cooperating UE (CUE) to assist at least one target UE by: the UE receiving a first demodulation reference symbol (DMRS) from a base station; the UE determining that the first DMRS is associated with a modulated scrambled data block transmitted by the base station for reception by the at least one target UE; the UE generating a DMRS based at least a group ID; modulating the DMRS to produce a modulated DMRS; transmitting the modulated DMRS for reception by at least one target UE; wherein the group ID is known by the UE and the at least one target UE (TUE), and the group ID comprises: a UE cooperation group ID (UC group ID) common to all members of a UC group; or UC sub-group ID specific to the target UE; or a UC group ID common to all members of a UC group and UC sub-group ID specific to the target UE.

Optionally, the UE is the only UE configured to assist the at least one target UE for the transmission, and wherein the group ID comprises: a UE cooperation group ID (UC group ID) common to all members of a UC.

Optionally, the UE is one of multiple UEs configured to assist the at least one target UE for the transmission, and wherein the group ID comprises: a group based ID combined with a CUE sub-group ID of the UE.

Optionally, the scrambling is also based on a group based data scrambling ID.

According to another aspect of the present disclosure, there is provided a method in a UE, or a method according to any preceding claim, the method comprising acting as a cooperating UE (CUE) to assist at least one target UE (TUE) by: the UE scrambling a CRC of a set of sidelink control information (SCI) information bits based on at least a group ID, the SCI information bits and the scrambled CRC together forming an SCI coded block; the UE scrambling the SCI coded block based on at least a group ID to produce a scrambled SCI coded block; modulating the scrambled SCI coded block to produce a modulated SCI coded block; transmitting the modulated SCI coded block for reception by the at least one TUE; wherein the group ID is known by the UE and the at least one target UE (TUE).

Optionally, the group ID comprises: a UE cooperation group ID (UC group ID) common to all members of a UC group; or UC sub-group ID specific to the target UE; or a UC group ID common to all members of a UC group and UC sub-group ID specific to the target UE; or cell ID; or cell ID combined with one or both of UC group ID and UC sub-group ID.

Optionally, for unicast transmission to a single TUE, the group ID comprises: a UE cooperation group ID (UC group ID) common to all members of a UC group combined with a TUE sub-group ID.

Optionally, for multicast or group-cast transmission to a group of TUEs, the group ID comprises: a UE cooperation group ID (UC group ID) common to all members of a UC group.

Optionally, the scrambling is also based on a group based control scrambling ID.

Optionally, the group based control scrambling ID is based on a configuration of the group based control scrambling ID received via higher layer signaling.

According to another aspect of the present disclosure, there is provided a method in a UE, or a method summarized above or described herein, the method comprising acting as a cooperating UE (CUE) to assist at least one source UE (SUE).

Optionally, the method involves the UE assisting at least one source UE (SUE), by receiving traffic from the at least one SUE and forwarding the traffic to the base station or another UE.

Optionally, the UE is one of a group of more than one CUE in a UE group that are assisting the at least one target UE (TUE), wherein the UE group is associated with the group ID.

According to another aspect of the present disclosure, there is provided a method in a UE comprising acting as a target UE (TUE) by receiving a transmission of a data block and/or DMRS and/or SCI from at least one CUE generated in accordance with one of the methods summarized above or described herein.

In some embodiments, the method further comprises: receiving a transmission from a base station; performing diversity combination based on the transmission received from the base station and the transmission from at least one CUE.

According to another aspect of the present disclosure, there is provided a user equipment (UE) comprising at least a processor and memory, the UE configured to perform one of the methods summarized above or described herein.

BRIEF DESCRIPTION OF THE DRAWINGS

Embodiments of the disclosure will now be described with reference to the attached drawings in which.

DETAILED DESCRIPTION

Figure 1:
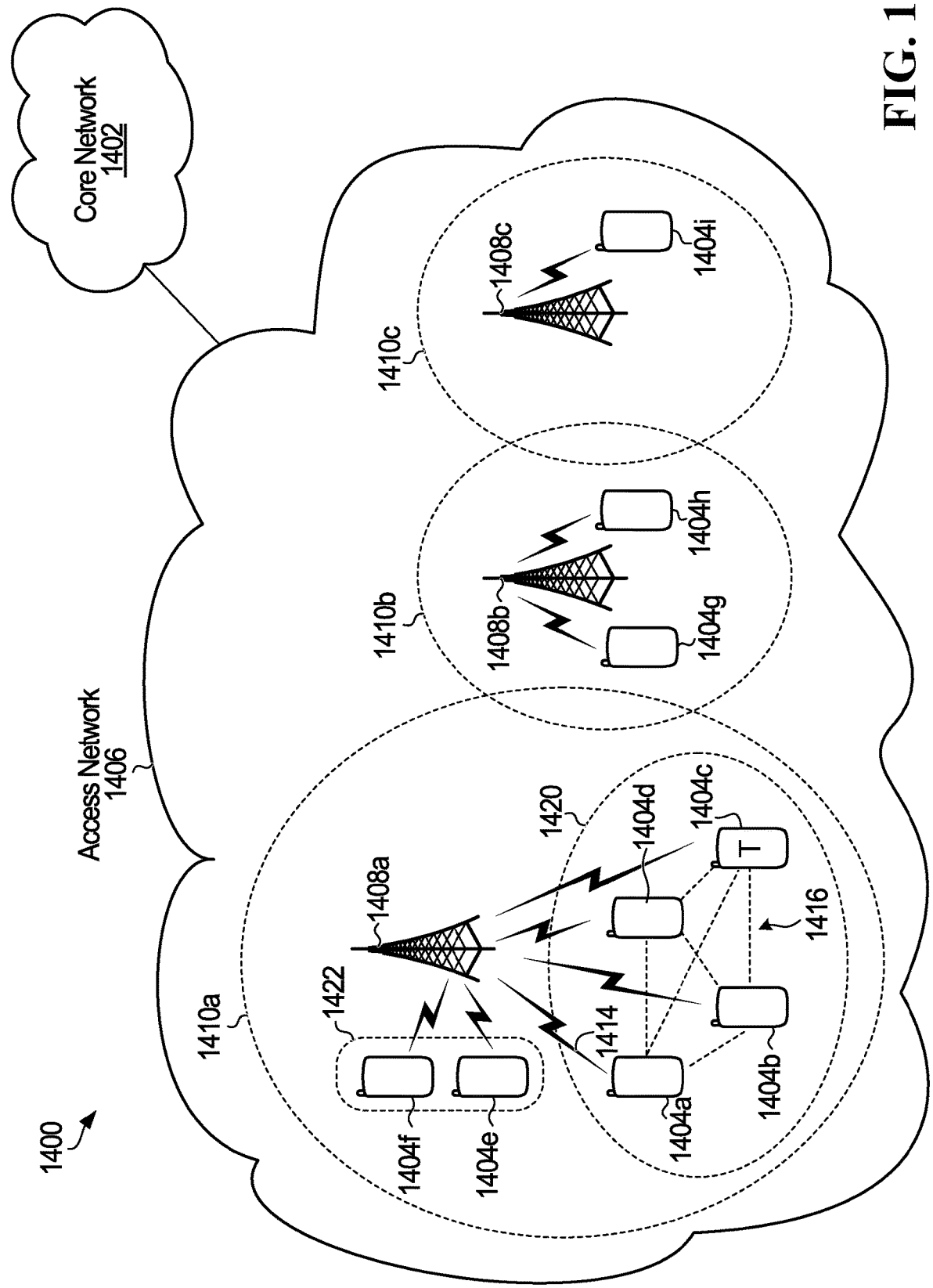
FIG. 1 is a block diagram illustrating an example of a telecommunications network according to one embodiment.

In V2X, a packet will be transmitted from one UE to another UE with resources and parameters that are either pre-configured or dynamically indicated. The packet transmission can be unicast or group-cast.

To make the UE cooperation (UC) operational, UEs in common vicinity form a UE cooperation group. UE cooperation will involve both transmissions between gNB and UEs (Uu link) and Sidelink (SL) transmissions between UEs.

For UE cooperation in NR, for example in DL transmission, the base station can transmit a packet to a target UE (TUE) with the help of one or more other UEs (referred to as cooperative UEs, or CUEs) in scenarios such as the TUE having poor channel conditions or a poor geographic location. For a DL packet transmission in the Uu link, the packet data and demodulation reference signal (DMRS) transmission is (or are) scrambled. If one or more CUE is able to help forward the packet data transmission to the TUE by making a SL transmission, this will involve each helping CUE receiving the packet data and DMRS, descrambling and re-scrambling (e.g., each by a different scrambling ID), and retransmitting (i.e., forwarding). The SL transmission includes UE identification and transmission identification.

With UE cooperation, multiple CUEs may forward or relay traffic to or from one or more TUEs, with the result that there are redundant version signal transmissions that can be combined upon reception. To make it possible for the redundant version signal transmissions to be combined or detected more efficiently, the redundant version signals in each UE (CUE or TUE) may be configured such that the redundant version signal transmissions can be transmitted or received in a cooperative way. Each redundant version transmission signal from each CUE (or TUE) and from a different transmission time interval is clearly defined. For a downward UC transmission (gNB downward to target UE in a UC group), even if one CUE from a group of cooperating UEs is not able to forward the traffic due to failure to successfully detect the traffic transmitted towards the TUE(s), the redundant version signals from the other UEs in the UC group can still be efficiently and jointly detected at the TUE(s). The redundant version signals from one or more UEs can be repeated once a NACK is received. Optionally, multiple repetitions of a packet transmission from one or more UEs may be configured. In this case, the repetition transmissions of the packet can be terminated by receipt of an ACK, for example, to avoid unnecessary interference to the system and save UE energy. In some embodiments, a packet can be delivered to its intended destination (e.g., TUE or gNB) via multiple hops involving multiple CUEs, i.e. a CUE in a UE cooperation group may forward or relay traffic to or from one or more other CUE(s) belonging to the group (or even another UC group that is configured to allow assistance among the groups) as part of the UC transmission process.

Towards this end, configuration and signaling mechanisms are needed to make the UC operation smooth and effective. In the Uu link, the gNB will need to configure UE grouping for a UE group, including a configuration of the transmission and receiving resources, redundant signal versions and forwarding scheme for a UE in the UC group.

The UC group then performs groupcast/broadcast transmission of a TUE's packet upon its arrival to the UC group. This can involve multiple CUEs receiving/detecting a packet from the gNB (on respective Uu links). The CUEs that correctly receive the packet or directly detect DMRS, and in particular those that are configured as helping UEs, will forward/send information on the packet to the associated TUE(s).

Each CUE may be configured with redundant version signals of the packet. This may be achieved by way of pre-configuration, semi-static configuration, or dynamic configuration. The CUEs forward the redundant version signals of the packet in dedicated resources or shared resources with the same or different HARQ process IDs, which are configured or indicated by way of pre-configuration, semi-static configuration, or dynamic configuration. Helping CUEs that are not able to correctly decode a packet or detect DMRS in a transmit time interval (TTI) will not forward anything.

A redundant signal version can be, for example, chase combining (CC), incremental redundancy (IR), one cyclic delay diversity (CDD) version or one Alamouti encoding version, whose encoding scheme is associated with a forwarding scheme, e.g., amplify and forward (AF), decode and forward (DF), compress and forward (CF), etc. The associated parameters may be pre-configured, semi-statically configured or dynamically configured, for example using sidelink control information (SCI).

The TUE(s) can receive/detect based on a received Uu signal (if possible), as well as the (possibly redundant version) signals from CUE(s) for signaling combining and detection as applicable. Once detected, the TUE(S) may provide feedback to CUE(s)/gNB accordingly.

In UC SL for an upward (from a source UE (SUE) to gNB) transmission, one or more SUEs can forward their packet(s) to one or more CUEs, and the CUE(s) will then forward the packets upward to the gNB.

To support UE cooperation in both Uu and SL links, systems and methods are provided that involve one or more of:

scrambling or/and forwarding TUE data by a helping CUE in a UC group;

for a CUE, transmitting a packet to a TUE via unicast or groupcast transmission in UC scenarios; and for TUE reception, identifying one or more CUEs that are forwarding the TUE packet.

Corresponding systems and methods are provided in relation to DMRS and SCI transmission and reception.

The scrambling employed in these embodiments can achieve up to three purposes:

a. Transmission identification: a transmission can be identified by a specific scrambling sequence, and the receiver can determine the scrambling sequence used to make the transmission and make the corresponding identification.

b. Data randomization: a more random signal can be more efficiently and reliably transmitted with interference randomization in the system;

c. Obscuring potentially confidential UE-specific information: there are situations where it may be desirable to treat a UE identifier as confidential, at least as between a given UE and other UEs. Of course, the network needs to know the UE ID. In conventional UE to BS transmissions, there is no problem using the UE ID as a basis for signal identification. However, in UC scenarios, using the UE ID of the target UE would result in all UEs in the UC group knowing the UE ID of the target UE. As such, some embodiments provide for the use of a group ID; a group ID is an ID that is known to the UC group and can be configured via higher layer signaling, for example, but the group ID is not the same as any specific UE ID in the UC group.

Sequences for data scrambling and DMRS are usually pseudo-random sequences, which can be generated in various schemes depending on the motivations and objectives such as general scrambling, reference signals, lower PAPR (peak to average power ratio), etc. As an example of a general form of sequence that can be applied to data scrambling or DMRS, pseudo-random sequences can be defined by a length-31 Gold sequence. An output sequence c(n) of length $M_{PN}$, where n=0, 1, . . . , $M_{PN}$−1, is defined by Eq. (1)

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad (1)$$

where $N_C$=1600 and the first m-sequence $x_1(n)$ is initialized with $x_1(0)$=1, $x_1(n)$=0, n=1, 2, . . . , 30. The initialization of the second m-sequence, $x_2(n)$, is denoted by $c_{init}=\Sigma_{i=0}^{30} x_2(i) \cdot 2^i$ with the value depending on the application of the sequence.

In the detailed examples below, sequences are employed for SL data or DMRS scrambling that are based on the above general example. However, it should be understood that the embodiments are not limited to the specific examples.

When there are multiple inputs to scrambling sequence generation, these can be combined in various ways. When equation 1 is applied to different applications or scenarios, each scenario may have different ways of determining the initialization $c_{init}$, examples of which will be provided in the following paragraphs.

FIG. 1 is a block diagram illustrating an example of a telecommunications network 1400 according to one embodiment, for implementing any one or combination of two or more of the methods described herein. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud radio access network (C-RAN). The access network 1406 includes a plurality of BSs 1408a, 1408b, and 1408c. The BSs 1408a-c each provides a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

Figure 4:
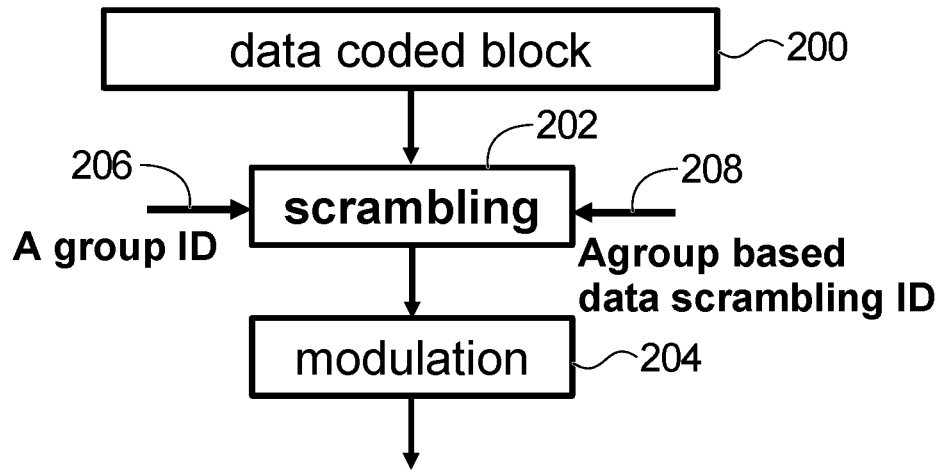
FIG. 4 is a block diagram illustrating group based data scrambling (descrambling is with the reverse process)

UEs 1404a-d are in close proximity to each other. The UEs 1404a-d can each wirelessly communicate with the BS 1408a, and they can also directly communicate with each other, as represented at 1416. The communications represented at 1416 are direct communications between UEs that do not go through an access network component, such as a BS. As shown in FIG. 4, UE to UE communications 1416 are directly between the UEs 1404a-d and are not routed through the BS 1408a or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a wireless radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), Fifth Generation (5G) New Radio (NR), and Wi-Fi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and takes on the role of the target UE. The UEs in a UE group other than the TUE form a cooperation candidate set, which is a set of UEs that may cooperate to help the TUE. In FIG. 1, UEs 1404a, 1404b, and 1404d in the group 1420 form a cooperation candidate set. The subset of UEs in a cooperation candidate set that actually assist the target UE form a cooperation active set. The cooperation active set may be dynamically selected to assist the target UE. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time. More generally, the cooperation candidate can be updated as needed. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 1 form another UE group 1422.

Figure 2:
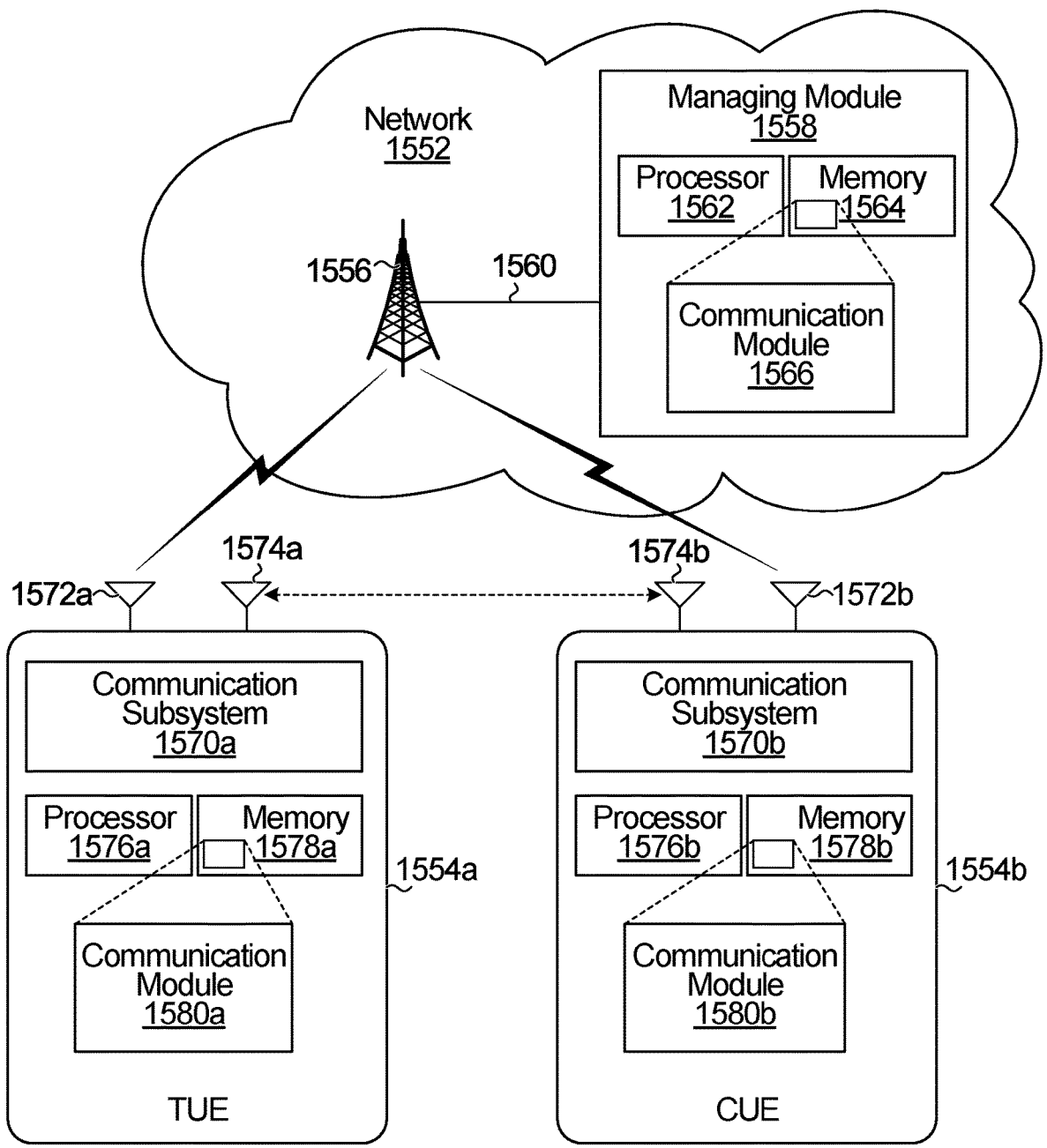
FIG. 2 is a block diagram illustrating an example of a network serving two UEs.

FIG. 2 is a block diagram illustrating an example of a network 1552 serving two UEs 1554a and 1554b, according to one embodiment. The network 1552 may be the access network 1406 from FIG. 4, and the two UEs 1554a and 1554b may be two of the four UEs 1404a-d in FIG. 7, or the UEs 1554a and 1554b may be UEs 1404e and 1404f in FIG. 4. However, more generally this need not be the case, which is why different reference numerals are used in FIG. 5.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554b includes the same components described above with respect to the UE 1554a. That is, UE 1554b includes communication subsystem 1570b, antennas 1572b and 1574b, processor 1576b, memory 1578b, and communication module 1580b.

The UE 1554a is designated as a target UE (TUE) and will therefore be called TUE 1554a. The UE 1554b is a cooperating UE and will therefore be called CUE 254b. The CUE 1554b may be able to assist with wireless communications between the BS 1556 and TUE 1554a if a UE group were to be established that included TUE 1554a and CUE 1554b. Other communication scenarios are also contemplated, and could be applied in a V2X application.

UE 1554a may be specifically chosen as the target UE by the network 1552. Alternatively, the UE 1554a may itself determine that it wants to be a target UE and inform the network 1552 by sending a message to the BS 1556. Example reasons why UE 1554a may choose or be selected by the network 1552 to be a target UE include: low wireless channel quality between the UE 1554a and the BS 1556, many packets to be communicated between the BS 1556 and the UE 1554a, and/or the presence of a cooperating UE that is a good candidate for helping with communications between the BS 1556 and the UE 1554a.

UE 1554a need not always stay a target UE. For example, UE 1554a may lose its status as a target UE once there is no longer a need or desire for assistance with wireless communications between UE 1554a and the BS 1556. UE 1554a may assist another target UE at a later time that was itself previously a cooperating UE. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554a acts only as a target UE, i.e., TUE 1554a, and the UE 1554b is a cooperating UE to the TUE 1554a, i.e., CUE 1554b.

FIGS. 1 and 2 illustrate systems in which embodiments could be implemented. In some embodiments, a UE includes a processor, such as 1576a, 1576b in FIG. 2, and a non-transitory computer readable storage medium, such as 1578a, 1578b in FIG. 2, storing programming for execution by the processor. A non-transitory computer readable storage medium could also or instead be provided separately, as a computer program product.

Packet forwarding by a CUE will now be described with reference to FIG. 3. For a CUE to help receive and forward a packet transmission to a TUE, the CUE detects the packet transmission and identifies the packet as being for the TUE before doing some processing if applicable and sending the packet to the TUE in accordance with a forwarding scheme. This involves the CUE detecting the DMRS and performing channel estimation based on the DMRS at block 100. If a decode and forward (DF) scheme is implemented (yes path block 102), then block 103 is performed, and otherwise block 112 is performed. Block 103 is a decode and forward scheme, in which demodulation, descrambling and decoding is performed at 104 whose output consists of data bits and the data CRC bits. In block 106, a cyclic redundancy check (CRC) is performed, and if the CRC fails, this is reported and the method stops. Otherwise, if the CRC passes, the CUE has recovered the correct data bits; then the data bits and the CRC bits are encoded to produce a data coded block. The data coded block is then rescrambled, and remodulated at 108 before transmitting the remodulated data signal at 109. The CUE also transmits a DMRS at 120 along with the data transmission at 109 to a TUE in SL.

Note that in some embodiments, the modulation scheme used in 108 over SL can be different than the modulation scheme used to transmit to the CUE over the Uu link. Because the CUE and TUE may be more favorably situated, there may be more options for modulation.

The DMRS transmitted by the CUE in SL needs to be different than the DMRS transmitted by the network (i.e., Uu link), because the DMRS is transmitted together with the data, such that the receiver (e.g., a TUE)) is able to distinguish between the DMRS associated with an original transmission of the data from the network, and the DMRS associated with another transmission from a CUE.

The data scrambling performed by the CUE for the SL transmission can be the same as or different than that performed by the network (for the Uu link), with the result that a TUE can receive multiple versions of the transmission (from the network and/or one or more CUEs) all using the same or different scrambling sequences for data, depending on configurations, e.g., unicast, groupcast, how many CUEs to help TUE(s), etc., to be detailed in the following.

Block 112 is a non-DF scheme for the packet forwarding. In some embodiments, this involves the CUE performing at least one of demodulation, sampling and compression steps at 114, and then remodulating at 116, and transmitting the result at 118. Once again, the CUE transmits a DMRS at 120 (with the same design as 109 for the DF scheme 103) along with the remodulated data signals at 116. In other embodiments, the block 112 is simply an amplify-and-forwarding (AF) scheme.

For SL transmission, embodiments are provided in which the identification and scrambling on a packet transmission are based on one or more of:

UE specific transmission resources;
UE group transmission resources;
UC group ID, TUE identity; and
CUE identity (or identities);

where UE identity (CUE identify for CUE, TUE identity for TUE) can be UE RNTI, DMRS, sub-group ID in a UC group, a temporary ID for UE cooperation, UE MAC ID(s) in SL, and/or UE Layer 1 (PHY layer) ID(s) in SL, where one or more of these identities can be pre-configured, semi-statically or/and dynamically configured via higher-layer signaling or/and PHY layer signaling.

Data Forwarding Embodiments

Group Based Data Scrambling for SL Transmission Based on Group ID+Group Based Data Scrambling ID Referring now to FIG. 4, shown is a first approach to data scrambling for SL transmission by a CUE. Note that FIG. 4, and other similar figures described herein, can be viewed as a flowchart of a method featuring method steps. In the case of FIG. 4, the method steps include scrambling 202 and modulation 204 steps. An input to the method is a data coded block 200. However, the figure (and other similar figures described herein) can alternatively be viewed as an apparatus, in which case the apparatus features a respective functional block corresponding to each method step. In the case of FIG. 4, this would include a scrambler (that performs the scrambling) and a modulator (that performs the modulation). Separate method and apparatus figures are not provided in the interest of brevity. In addition, the description of the flowchart of FIG. 4 and other similar flowcharts starts with a data coded block defined in 108 and simply uses "scrambling" or "modulation" terminology rather than "re-scrambling" or "remodulation".

For the purpose of FIG. 4, the CUE has already received data from the network over the Uu link, and has encoded the data (and its CRC bits) into a data coded block. The data coded block sequence is scrambled at 202 by a scrambling sequence that is determined by a group ID 206 and/or a group based scrambling ID. The group ID is, for example, a UE cooperation group ID (UC group ID), UC subgroup ID (i.e., sub-index associated with a specific UE in a UC group), or a combination of these. A group based data scrambling ID can be a scrambling ID configured by higher layer signaling, or can be a cell ID if not configured by the network.

Figure 3:
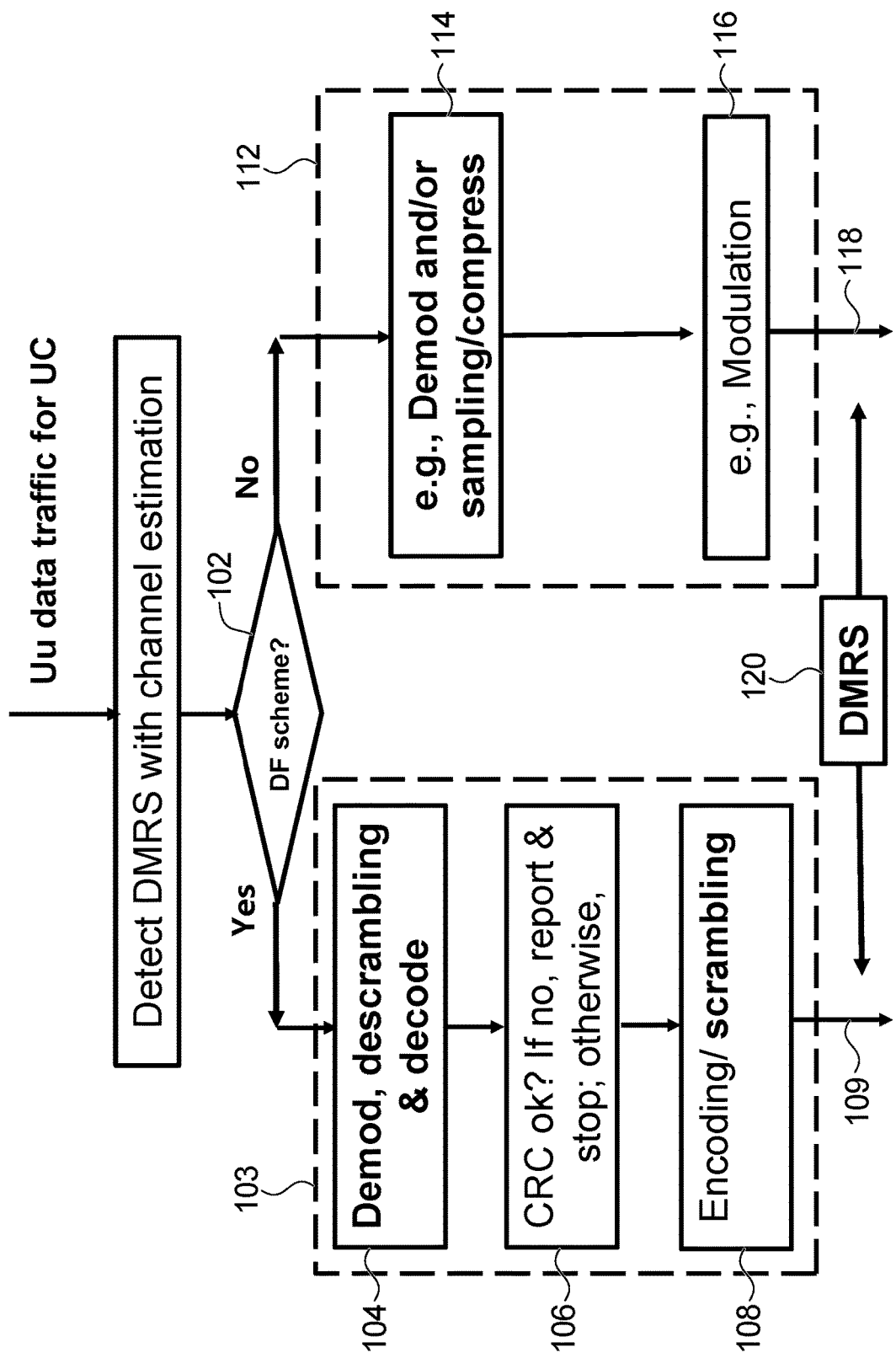
FIG. 3 is a block diagram illustrating CUE behavior in helping forward a TUE packet.

For a CUE decoding and forwarding case with group based data scrambling in SL, though not provided in FIG. 4, the CUE may need to perform demodulation on the received packet transmission from Uu link, and descrambling and decoding in the same way as described in 104 and 106 of FIG. 3. Once CRC is checked correctly, the CUE encodes the correctly received information bits and the information CRC to yield the data coded block. The data coded block is then scrambled and modulated as described in FIG. 4. If the CRC check fails, the CUE may report the error detection and/or act as instructed by configuration.

From the reception perspective, the TUE will demodulate and descramble the received transmission from the CUE. The descrambling procedure is a reverse process to FIG. 4. If more than one CUE is configured to forward data, the TUE will detect multiple diversity transmissions from multiple CUEs and combine the diversity transmissions for better detection if applicable.

For one codeword having index q (where q=0 or 1 is an index of two data streams) (or data coded block), a starting point is a block of bits $b^{(q)}(0), \ldots, b^{(q)}(M_{bit}^{(q)}-1)$, where $M_{bit}^{(q)}$ is the number of bits in codeword q to be transmitted on the physical channel. These bits are scrambled prior to modulation, resulting in a block of scrambled bits $\tilde{b}^{(q)}(0), \ldots, \tilde{b}(q)(M_{bit}^{(q)}-1)$ according to $$\tilde{b}^{(q)}(i) = (b^{(q)}(i) + c^{(q)}(i)) \bmod 2 \qquad (2)$$

where the scrambling sequence $c^{(q)}(i)$ is given by Eq. (1) and q is selected from {0 or 1}. In a specific example, the scrambling sequence generator is initialized with $$c_{init} = n_{RNTI} \cdot 2^{15} + q \cdot 2^{14} + n_{ID} \qquad (3)$$

Where $n_{ID} \in \{0, 1, \ldots, 1023\}$ is configured by the higher-layer signalling as a scrambling ID (or IDs), and $n_{ID}$=a group ID or $N_{ID}^{cell}$ if not configured; and $n_{RNTI}$ equals a group based ID, C-RNTI, MCS-C-RNTI, or CS-RNTI.

In the above:

A group based ID can be cell based, a group of cells based, or can be decoupled with any cell;

RNTI is radio network temporary identifier;

C-RNTI is cell-RNTI;

MCS-C-RNTI is modulation and coding scheme RNTI;

CS-RNTI is configured scheduling RNTI.

Figure 5:
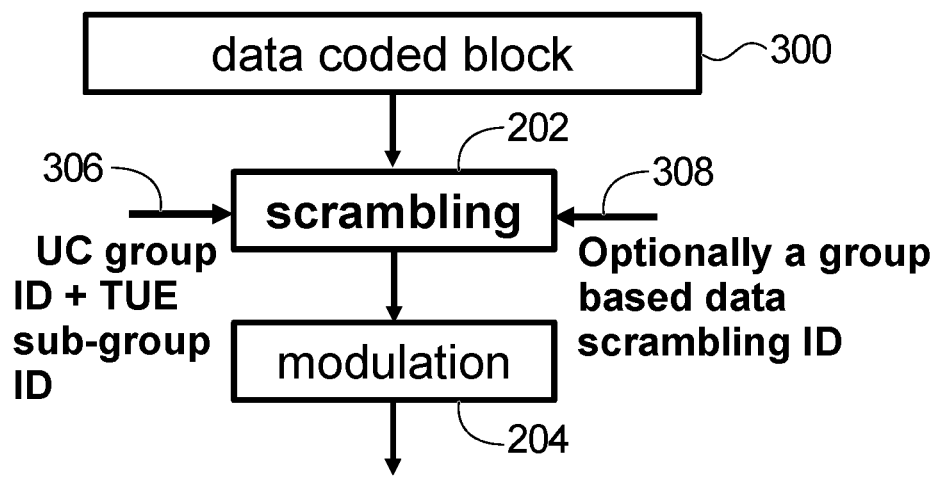
FIG. 5 is a block diagram illustrating data scrambling for unicast transmission (or reverse for descrambling process)

Group Based Data Scrambling for Unicast Transmission Based on UC Group ID+TUE Sub-Group ID+Group Based Data Scrambling ID Referring now to FIG. 5, shown is an approach to data scrambling for unicast transmission. The data coded block is scrambled at 202 by a scrambling sequence whose initialization is a function of UC group ID and TUE sub-group ID. Optionally, $c_{init}$ is also a function of a group based data scrambling ID that may, for example be configured by higher layer signaling (such as RRC) or by pre-configuration, for SL unicast transmission. Note that if more than one CUE is configured to help the TUE, a configured diversity scheme can be applied for each CUE.

The scrambling sequence initialization is based on which is a function of at least one of UC group ID, UE ID, sub-group ID(s), a group based data scrambling ID(s). In some embodiments, the formulation based on Eq. (3) is used. In this case the group ID in Eq. (3) can be replaced by a function of at least one of UC group ID, UE ID(s), TUE sub-group ID, CUE subgroup ID, SUE and cell ID.

From the reception perspective, the TUE will demodulate and descramble the received transmission from the CUE. The demodulation and descrambling procedure is a reverse process to FIG. 5 for CUE transmission. If more than one CUE is configured to forward data, the TUE will detect multiple diversity transmissions from the CUEs and combine the diversity transmissions for better detection if applicable.

The above transmission resources and parameters can be configured or indicated by RRC/SL-RRC or/and DCI/SCI.

Figure 6:
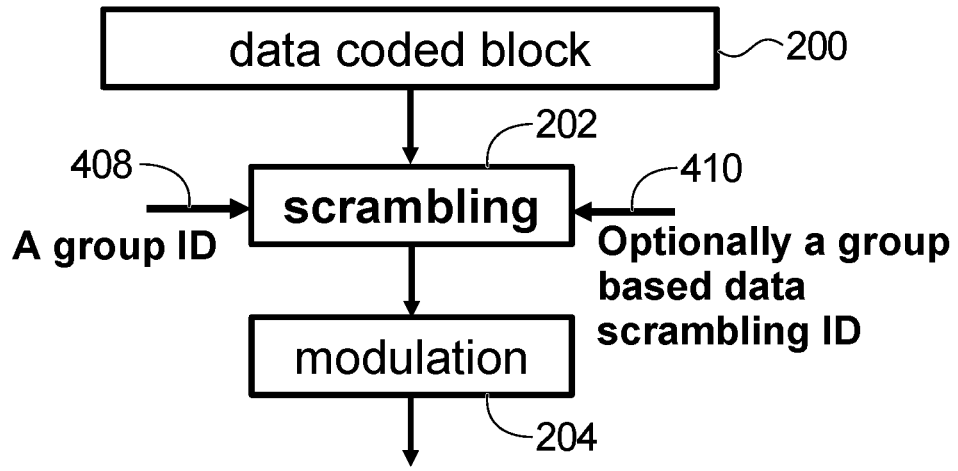
FIG. 6 is a block diagram illustrating data scrambling for groupcast (or reverse for descrambling process)

Group Based Data Scrambling for Groupcast Transmission Based on UC Group ID+Group Based Data Scrambling ID Referring now to FIG. 6, shown is an approach to data scrambling for groupcast transmission. The data coded block is scrambled at 202 by a scrambling sequence that is a function of UC group ID. Optionally, the scrambling sequence is also a function of a group based data scrambling ID configured by higher layer signaling (e.g., RRC) or by pre-configuration, for SL groupcast transmission. Note that if more than one CUE is configured to help the TUE, a configured diversity scheme can be applied for each CUE.

The scrambling sequence initialization is based on $c_{init}$ which is a function of at least one of UC group ID, UE ID(s), sub-group ID(s), a group based data scrambling ID(s). In some embodiments, a formulation based on Eq. (3) is used. Here, the more general a group ID in Eq. (3) is replaced by a function of at least one of UC group ID, UE ID(s) and cell ID.

From the reception perspective, the TUE will demodulate and descramble the received transmission from the CUE. The descrambling procedure is a reverse process to FIG. 6. If more than one CUE is configured to forward data, the TUE will detect multiple diversity transmissions from the CUEs and combine the diversity transmissions for better detection if applicable.

The above transmission resources and parameters can be configured or indicated by RRC/SL-RRC or/and DCI/SCI.

DMRS Embodiments

A demodulation reference symbol (DMRS) for data transmission is a sequence transmitted by a UE in a pattern of resource elements (REs) within a location. For example, a 10 element sequence might be transmitted using 10 REs. These can be associated with a pattern that defines the 10 REs within a 10 OFDM symbol by 100 subcarrier resource space. The location specifies which 10×100 resource space to use.

Figure 7:
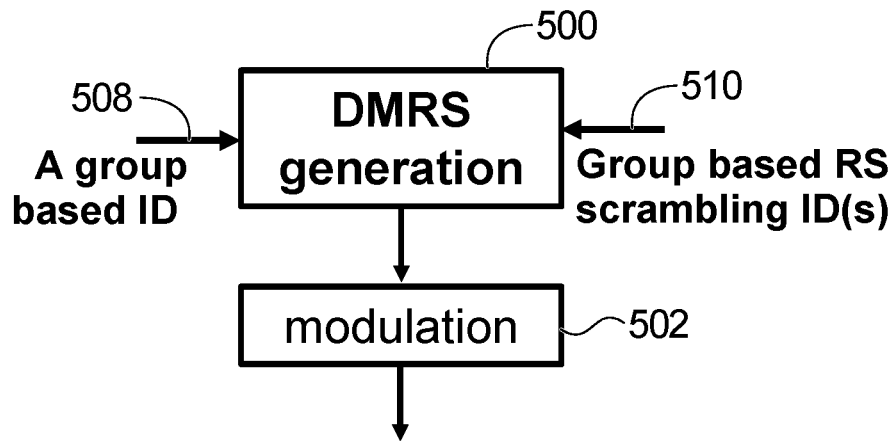
FIG. 7 is a block diagram illustrating DMRS generation for a SL data transmission for UC.

For the data transmission in SL, DMRS configuration can be employed for transmission identification and channel estimation for signal demodulation. Referring to FIG. 7, shown is a DMRS generator/generating step 500, and a modulator/modulation step 502. An input to the DMRS generator/generation 500 is one or more of the following:

a group based ID 508 such as UC group ID, a sub-group ID, or a combination of them;

one or more group based RS scrambling ID(s) 510 that can be configured by one or more of RRC, SL-RRC, DCI and SCI signaling; or cell ID if not configured or by default.

The DMRS generator/generation 500 may also use an $n_{SCID}$ defined/configured by one or more of RRC, SL-RRC, DCI and SCI signaling, or a predefined default value (e.g., 0).

A group ID and a group based scrambling ID(s) can be applied to generate DMRS for data transmission. In some embodiments, the UE uses a DMRS sequence r(n) defined by Eq. (4)

$$r(n) = \frac{1}{\sqrt{2}}(1 - 2 \cdot c(2n)) + j\frac{1}{\sqrt{2}}(1 - 2 \cdot c(2n+1)). \quad (4)$$

where the pseudo-random sequence c(i) is defined in Eq. (1). The pseudo-random sequence generator is initialized based on $c_{init}$=a function of at least one of a group ID, UE ID(s), sub-group ID(s), a group based data scrambling ID(s), and $n_{SCID}$. In some embodiments a formulation based on Eq. (5) given below is used $$c_{init} = (2^{17}(N_{symb}^{slot} n_{s,f}^{\mu} + l + 1)(2N_{ID}^{nSCID} + 1) + 2N_{ID}^{nSCID} + n_{SCID}) \bmod 2^{31} \quad (5)$$

where l is the OFDM symbol number within the slot, $n_{s,f}^{\mu}$ is the slot number within a frame, and $N_{ID}^0, n_{ID}^1 \in \{0, 1, \ldots, 65535\}$ are given by the higher-layer parameters group based RS scramblingID0 and group based RS scramblingID1, respectively, in higher-layer signalling if provided. In this case, PDSCH is scheduled by PDCCH with the DCI CRC scrambled by a group ID, C-RNTI, MCS-C-RNTI, or CS-RNTI; or $N_{ID}^0 \in \{0, 1, \ldots, 65535\}$ is given by the higher-layer parameter group based RS scramblingID0 in higher-layer signaling if provided. In this case, the PDSCH is scheduled by PDCCH with the DCI CRC scrambled by a group ID, C-RNTI, MCS-C-RNTI, or CS-RNTI; or $N_{ID}^{nSCID}$=a Group ID or $N_{ID}^{cell}$ otherwise;

The quantity $n_{SCID} \in \{0, 1\}$ may be specified given by a DMRS sequence initialization field, in the DCI associated with the PDSCH transmission, otherwise $n_{SCID}$=0.

DMRS Sequence Generation when Only One CUE is Configured to Help TUE(s)

Figure 8:
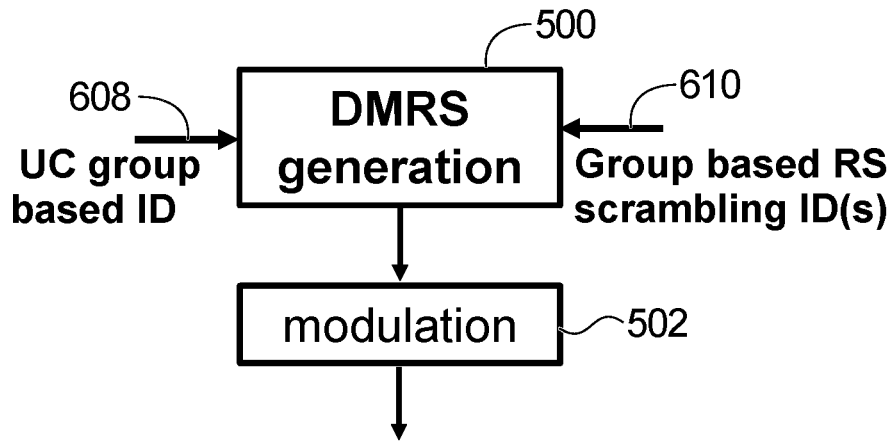
FIG. 8 is a block diagram illustrating DMRS sequence generation when only one CUE is configured to help TUE(s)

Referring now to FIG. 8, shown is an embodiment where only one CUE is configured to help TUE(s), and the DMRS sequence generation 610 is associated with the UC group ID 608 or/and a configured group based RS scrambling ID(s) 610 for either unicast or groupcast data transmission from the CUE. These configurations can be done by one or more of RRC, SL-RRC, DCI and SCI signaling. In this configuration, the single CUE acts as a UE relay, with a special characteristic to scramble the forward traffic (in the SL). The CUE may relay or forward a (scrambled) packet to a TUE (or UEs) in a UE cooperation group. For SL unicast transmission in UC, the UC group based ID in FIG. 8 can be replaced by the TUE sub-group ID, the CUE sub-group ID or a combination of UC group ID with either of the TUE sub-group ID and the CUE sub-group ID. Alternatively or furthermore, the DMRS sequence generation in FIGS. 7~9 may involve antenna port and/or beamforming configurations in terms of a UE group based, UC group based, TUE based or/and CUE based antenna port and beamforming parameters. In some embodiments, both unicast and groupcast are supported. Which of the two transmission types (unicast or groupcast) is to be performed in SL can be configured or indicated by RRC/SL-RRC or DCI/SCI.

The pseudo-random sequence generator is initialized based on $c_{init}$=a function of at least one of UC group ID, UE ID(s), sub-group ID(s), a group based data scrambling ID(s), and $n_{SCID}$. In some embodiments, a formulation based on Eq. (5) is used where a group ID can be a UC group ID, a TUE/SUE ID, a CUE ID, a sub-group ID, or a combination of them.

For a TUE reception on DMRS detection, the TUE may use the UC group ID or/and a configured group based RS scrambling ID(s) as described in FIG. 8 to detect DMRS. If DMRS is detected correctly, the TUE will perform data demodulation and descrambling following the data procedure described in the previous paragraphs. For groupcast such as in FIG. 8, all TUE(s) in the UC group will need to detect the CUE DMRS and then follow the demodulation and descrambling procedure.

DMRS Sequence Generation when More than One CUE is Configured to Help TUE(s)

Figure 9:
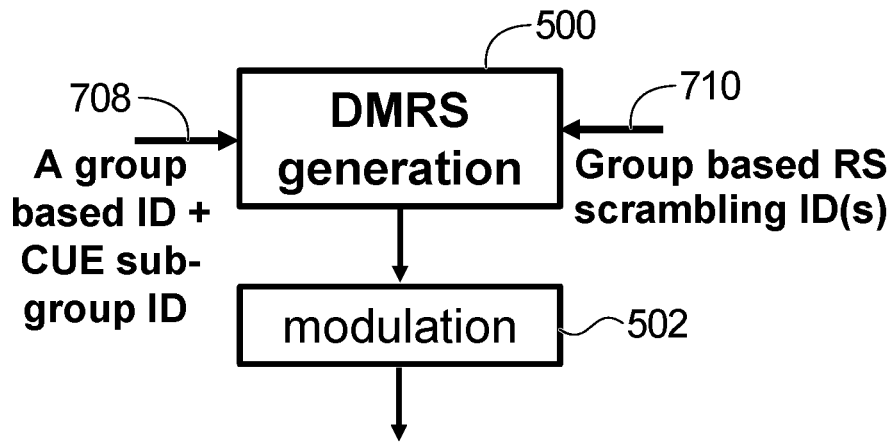
FIG. 9 is a block diagram illustrating DMRS sequence generation when more than one CUE is configured to help TUE(s)

In other embodiments where more than one CUE is configured to help TUE(s), the DMRS sequence generation is associated with one or more of UC group ID, CUE sub-group ID, TUE sub-group ID 708 and configured group based RS scrambling ID(s) 710 for either unicast or groupcast data transmissions from more than one CUE, as shown in FIG. 9. Two or more CUEs apply a certain (joint) transmission scheme such as Alamouti encoding or diversity encoding that can be configured. These configurations can be done by one or more of RRC, SL-RRC, DCI and SCI signaling.

The pseudo-random sequence generator is initialized with a function of $c_{init}$=a function of at least one of UC group ID, UE ID(s), sub-group ID(s), a group based data scrambling ID(s), and $n_{SCID}$. In some embodiments, a based on Eq. (5) is used where the group ID can be a UC group ID, a TUE/SUE ID, a CUE ID, a sub-group ID, or a combination of them. The objective is for a TUE/SUE to be able to detect the helping transmission sources from the multiple CUEs for appropriate signal combining or joint detection. The design on DMRSs for data transmissions of two or more CUEs can be considered from two perspectives: 1) the DMRSs in the data transmissions are different from CUEs and thus are identifiable in terms of transmission UE(s) at the receiver end; 2) the DMRSs in the data transmissions can have the same or different forms, and refer to the reception UE. As a result, DMRSs from multiple transmission ends can be associated with UC group ID, UE IDs, subgroup ID(s) for TUE/SUE, subgroup ID(s) for CUEs, time-frequency resource allocations, etc., as long as the DMRS formations can be unique in terms of a combination of these associations. For example, two CUEs may use a single/same DMRS to forward the data packets in identifiable time-frequency resources where the DMRS can be designed based on TUE IDs or UC group ID with TUE sub-group ID; or can use CUEs' individual (and different) DMRSs to transmit the data in same time-frequency resources (and possibly with different transmission redundant/diversity versions that are configured). The CUEs' individual (and different) DMRSs can be designed based on their individual IDs or optionally to be designed based on UC group ID with individual CUE subgroup ID.

For a TUE to perform DMRS detection, the TUE differentiates the transmissions from more than one CUE. A TUE may use the same defined/configured IDs used for DMRS generation as described in FIG. 9 to detect DMRS(s) for data transmission(s) from the CUE(s). If more than one data transmission is received, the TUE may detect and combine the transmissions from different CUEs according to a configured transmission scheme. These configurations can be done by one or more of RRC, SL-RRC, DCI and SCI signaling.

SL Control Information (SCI) Embodiments

The SL control information (SCI) carries scheduling and configuration for a SL data transmission, including at least one of time-frequency resources, data scrambling sequence(s), DMRS configuration(s), Modulation and coding scheme (MCS), group ID, CUE identification, TUE identification, CUE forwarding scheme, beamforming parameters, HARQ configuration, etc.

Figure 10A:
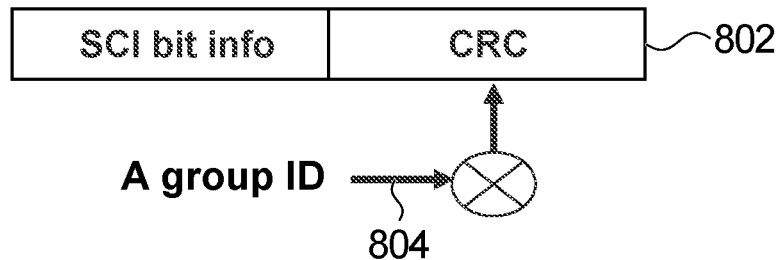
FIGS. 10A and 10B are block diagrams illustrating scrambling schemes for SCI CRC and its coded block.

In some embodiments, a CRC is computed based on SCI information bits, and the CRC is scrambled at 804 by a group ID as shown in FIG. 10A. The overall SCI includes SCI information bits, and the CRC parity bits. After attachment, the CRC parity bits are scrambled with a group or UE ID, $x_{rnti,0}, x_{rnti,1}, \ldots, x_{rnti,15}$, where $x_{rnti,0}$ corresponds to the MSB of the RNTI (i.e., the group ID or UE specific ID here), to form the sequence of bits $c_0, c_1, c_2, c_3, \ldots, c_{K-1}$. The relation between $c_k$ and $b_k$ is:

$c_k = b_k$ for k=0, 1, 2, ..., A+7, and $$c_k = (b_k + x_{rnti,k-A-8}) \bmod 2 \text{ for } k=A+8, A+9, A+10, \ldots, A+23, \qquad (6)$$

where K=A+L, A is the payload size and L is the number of parity bits. The group ID can be a function of at least one of UC group ID, UC sub-group ID (CUE or/and TUE), a Cell ID, or a combination of them. SCI will be used to support both unicast and groupcast (or broadcast). SCI may or may not indicate/configure a resource and transmission parameter pool for a group of UEs in UC. After the CRC scrambling, the information bits and the scrambled CRC are encoded to produce a SCI coded block, and the SCI coded block is subject to further scrambling as shown in FIG. 10B.

Figure 10B:
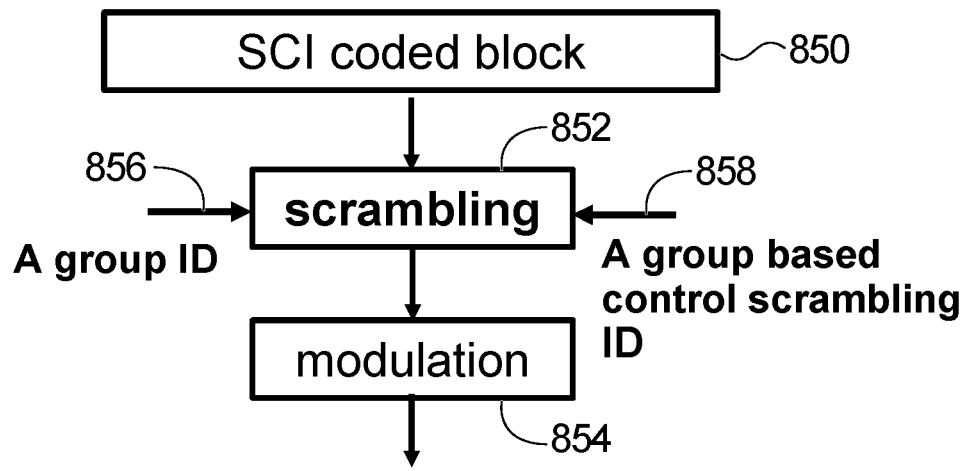

As shown in FIG. 10B, an SCI coded block 850 is scrambled 852 by a function of at least of one of a group ID 856 and a group based control scrambling ID 858. A group ID can be can be a function of at least one of UC group ID, UC sub-group ID (TUE or/and CUE). A group based control scrambling ID can be a configured scrambling ID for its DMRS by higher layer signaling, which, for example, can be a group ID, or cell ID by default or if not configured by the network. Following scrambling at 858, the scrambled SCI is modulated at 854, and then transmitted with DMRS used for SCI transmission.

For SCI coded block scrambling, a group ID or/and a group based control scrambling ID can be used. For example, the UE has a block of bits b(0), . . . , b($M_{bit}$–1) to transmit, where $M_{bit}$ is the number of bits transmitted on the physical channel, these bits are scrambled prior to modulation, resulting in a block of scrambled bits b̃(0), . . . , b̃($M_{bit}$–1) according to $$\tilde{b}(i)=(b(i)+c(i))\bmod 2$$

where the scrambling sequence c(i) is given by Eq. (1). The scrambling sequence generator is initialized with $$c_{init}=(n_{RNTI} \cdot 2^{16}+n_{ID})\bmod 2^{31} \quad (7)$$

where
for a UE-specific search space, $n_{ID} \in \{0, 1, \ldots, 65535\}$ equals the higher-layer parameter value of group based scrambling ID (or a UE specific scrambling) if configured,
$n_{ID}=N_{ID}^{cell}$ otherwise
and where
$n_{RNTI}$ is given by the group ID, the C-RNTI for a PDCCH in a UE-specific search space if the higher-layer parameter, group based scrambling ID (or a UE specific scrambling ID is configured, and
$n_{RNTI}=0$ otherwise.

In some embodiments, DMRS for SCI transmission is generated based on a group ID (as described above) or/and a configured ID for a UC group.

SL Control Information (SCI) for Unicast

Figure 11A:
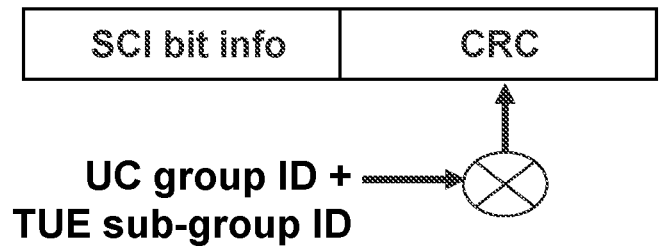
FIGS. 11A and 11B are block diagrams illustrating a scrambling scheme on SCI CRC and coded block for unicast.
Figure 11B:
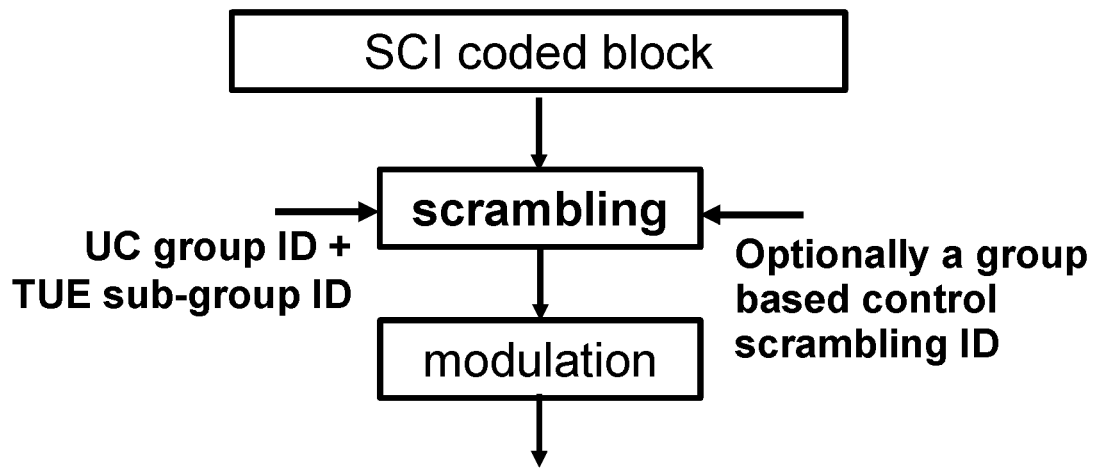

In a specific example, for unicast transmission, the SCI CRC is scrambled using a group ID that is a function of the UC group ID and TUE sub-group ID (or index in the group) as shown in FIG. 11A. Following this, SCI coded block scrambling is performed as shown in FIG. 11B, using the same function used for the SCI CRC, and optionally a group based control scrambling ID is configured by higher-layer signaling, e.g., RRC/SL-RRC. Alternatively or furthermore, the group ID is a function of one or more of UC group ID, TUE sub-group ID, TUE PHY identity, TUE MAC ID, TUE higher-layer ID, CUE sub-group ID, CUE PHY identity, CUE MAC ID, CUE higher-layer ID, and cell ID that are pre-configured or configured by higher-layer signaling or PHY layer signaling; such defined group ID may also be applicable to associated Figures described previously (e.g., FIGS. 5 and 9) and after (e.g., FIGS. 11A and 11B).

For SCI coded block scrambling for unicast, UC group ID, UE ID or/and TUE sub-group ID can be used for CRC scrambling using a formulation based on equation (6). The UE SCI coded block can be applied with a formulation based on equation (7), where $n_{RNTI}$ is given by UC group ID, UE ID, TUE subgroup ID, CUE subgroup ID or/and a group based scrambling ID (or a UE specific scrambling ID). DMRS generation may be based on a group ID (e.g., $n_{RNTI}$) and/or group based RS scrambling ID.

Receiving UE (TUE) behavior for this case involves all of the TUEs in the UC group detecting the SCI. Following that, the TUE that is intended for reception will receive the forwarded data from the CUE(s). Based on configured UC operation mode (e.g., only one CUE or more than one CUE to forward data), the TUE will receive the forwarded data accordingly as described previously.

SL Control Information (SCI) for Group/Broadcast

Figure 12A:
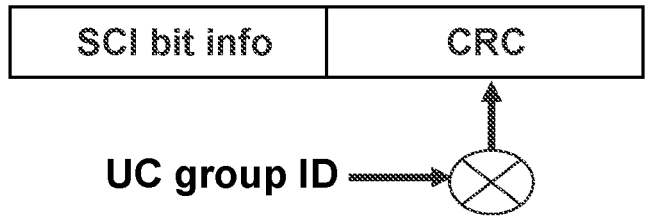
FIGS. 12A and 12B are block diagrams illustrating a scrambling scheme on SCI CRC and coded block for group/broadcast.
Figure 12B:
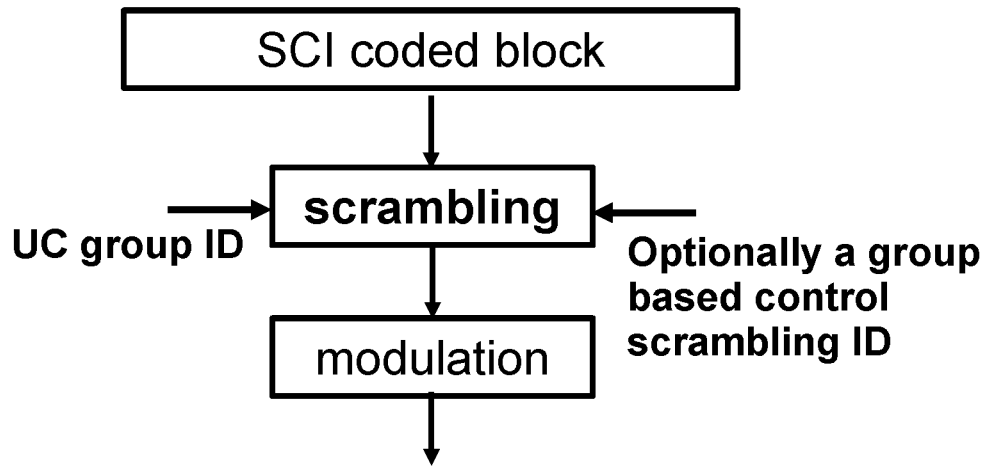

In a specific example, for group/broadcast transmission, the transmission UE (CUE) scrambles the CRC with a UC group ID, as depicted in FIG. 12A. SCI coded block scrambling is performed as depicted in FIG. 12B, using a function of at least one of the UC group ID, a group based control scrambling configured by higher layer signaling, e.g., RRC/PCS-RRC.

For SCI coded block scrambling for groupcast/broadcast, UC group ID, cell ID, UE ID or/and TUE sub-group ID can be used for CRC scrambling using a formulation based on equation (6). The UE SCI coded block can be applied with a formulation based on equation (7), where $n_{RNTI}$ is given by UC group ID, cell ID, UE ID, TUE subgroup ID, CUE subgroup ID or/and a group based scrambling ID (or a UE specific scrambling ID). DMRS generation may be based on a group ID (e.g., $n_{RNTI}$) and/or group based RS scrambling ID.

SCI will be sent to the UE group via a control channel resource configured by higher layer signaling, e.g., RRC/PCS-RRC, pre-configured or pre-defined.

Receiving UE (TUE) behavior for this case involves all the TUEs in the UC group detecting the SCI in order to obtain transmission parameters, for example a resource allocation for data. Based on configured UC operation mode (e.g., only one CUE or more than one CUE to forward data), the TUE(s) will receive the forwarded data accordingly as described previously.

Transmissions from Source UE to Base Station Via CUE

The above embodiments have focused on transmission from a base station to a TUE via one or more CUEs. For a UE cooperative transmission from a SUE to the base station via a CUE, i.e., SL and uplink transmission, the SUE in a UC may generate DMRS as shown in FIG. 13A and perform data scrambling in SL as shown in FIG. 13B.

Figure 13A:
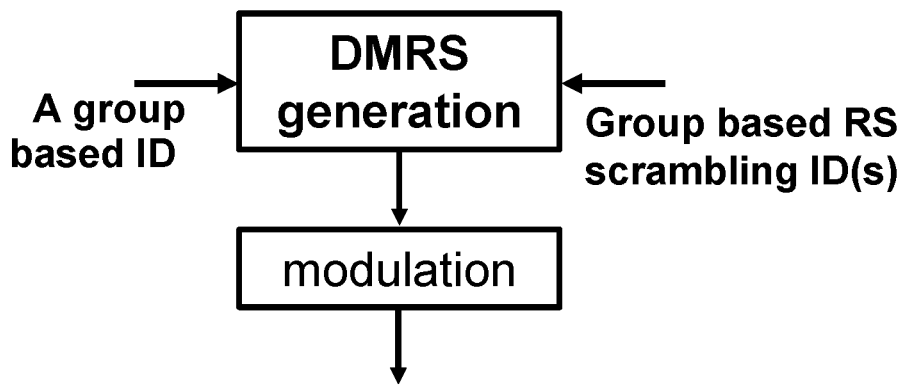
FIG. 13A is a block diagram illustrating DMRS sequence generation for a sidelink SUE data transmission.

As shown in FIG. 13A, SUE DMRS generation uses a group based ID(s). The pseudo-random sequence generator for SUE DMRS is initialized based on $c_{init}$=a function of at least one of UC group ID, UE ID(s), sub-group ID(s), a group based data scrambling ID(s), and $n_{SCID}$. In some embodiments, the formulation in Eq. (5) is used where group ID can be a UC group ID, a TUE/SUE ID, a CUE ID, a sub-group ID, or a combination of them. For DMRS, in some embodiments, the SUE transmits the SUE's DMRS configured by either semi-statistic (e.g., higher-layer, RRC signaling) or dynamic signaling (e.g., DCI/SCI).

This can, for example, be a function of at least one of the UC group ID, SUE subgroup ID. DMRS generation may also be based on a configured group based RS scrambling ID.

Figure 13B:
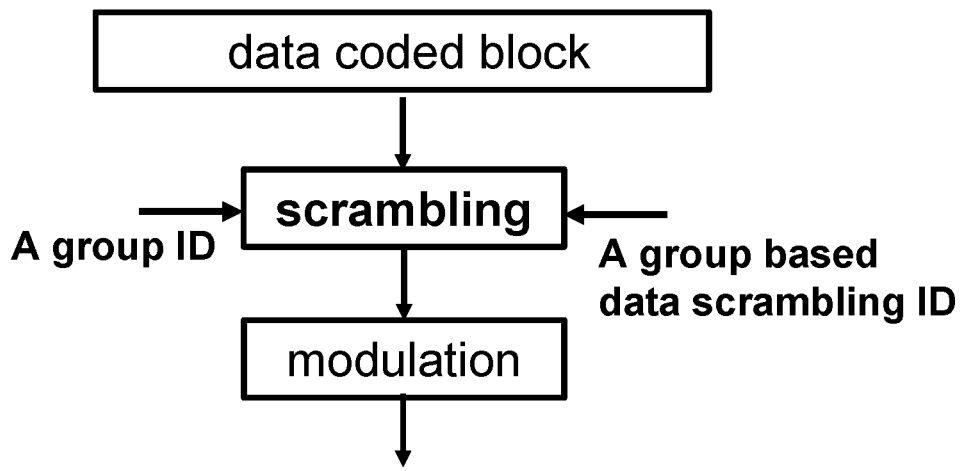
FIG. 13B is a block diagram illustrating sidelink SUE data scrambling.

As shown in FIG. 13B, SUE data scrambling may be based on a group ID that may be a function of at least one of UC group ID, SUE sub-group ID, and a group based data scrambling ID configured by higher layer signaling, semi-static or dynamic configuration to support either unicast or groupcast.

For data coded block scrambling, for example, the scrambling sequence initialization is based on $c_{init}$=a function of at least one of UC group ID, UE ID, sub-group ID(s), a group based data scrambling ID(s). One embodiment is to use formulation in Eq. (3), where in this case a group ID can be replaced by a function of at least one of UC group ID, UE ID(s), SUE sub-group ID, CUE subgroup ID, SUE and cell ID.

CUE Behavior for Transmissions from Source UE to Base Station Via CUE

One or more CUEs can be configured to help the SUE. One or more CUEs detect SUE DMRS (as known to the CUEs). One or more CUEs will perform data demodulation, and descrambling using reverse procedure described in FIGS. 13A and 13B, and if the decoded bits pass CRC check, these bits will be re-encoded, re-scrambling and re-modulated before forwarding to the base station. The re-scrambling for Uu link can have the same or different scrambling sequence from SL.

CUE with Knowledge of Specific UE Information Including Scrambling IDs

The above embodiments have focused on the use of various group based IDs, and group based scrambling IDs for DMRS, data and SCI transmission. More generally, for UE cooperation or relaying in a UC group, as long as a CUE has knowledge of specific UE transmission and parameter information such as the UE ID(s), its (their) corresponding scrambling ID(s), UE transmission state (e.g., RRC connected, or RRC idle, etc.), and/or DRX cycle in SL/Uu link, etc., on one or more TUEs (or SUEs), the CUE is able to either forward downward the transmissions of the packets to the TUE(s) from the base station or forward upward the transmissions of part or entire packets from the SUE(s) to the base station, given the pre-configured (by, e.g., higher-layer signaling) or/and dynamically configured (by, e.g., L1 signaling) cooperation relationship between CUE(s) and TUE(s)/SUE(s).

A CUE can be configured or defined as to provide an operational function of either bidirectional (i.e., forwarding both DL and UL traffic in SL) or unidirectional (i.e., forwarding either UL or DL traffic in SL). Moreover, the two operational functions from a CUE may be different. For example, the resource configuration or allocation for UC in a SL transmission with CUE bidirectional operation can be similar to the base station's, e.g., using control information to allocate the transmission resources and parameters (i.e., SCI in SL link to take a similar functionality of DCI in Uu link). A CUE with unidirectional operation may not able to operate in such a manner. However, the resource configuration or allocation should be the same for bidirectional and unidirectional operations in terms of a CUE (and a base station) requiring transmission & parameter information to send any packet from the base station to a TUE or receive any packet from a SUE to forward/relay to the base station.

In some embodiments, the members within a UC group can share some temporary IDs such as the above referenced UE ID such as RNTI and the UE scrambling ID(s) for UE data scrambling/identification and transmissions in a SL or a Uu link; for example, a family of members, members or devices in a factory or corporation, a group of validated or security-checked members, or a dynamically/temporarily formed group for public events or rescue, etc., can share their mutual IDs necessary for data transmissions. This shared information can be exchanged between CUE(s) and TUE(s)/SUE(s), pre-configured semi-statically by high-layer signaling, or configured dynamically by DCI or SCI. As a result, instead of a group ID for a UC group, at least a CUE with a helping relationship with a TUE/SUE can have the TUE/SUE ID and its specific scrambling ID(s) if needed. Thus, in a Uu link transmission, the TUE/SUE ID such as RNTI can be used to scramble DCI CRC in the PDDCH channel, such that the helping CUE can detect the traffic from the DCI for and then forward towards the TUE/SUE.

In above embodiments, the CUE detects a DCI message (e.g., scheduling information) from a Uu link multiple times, one detection attempt based on its own ID (to check if any traffic to itself, if not) and the other detection attempt(s) based on the ID(s) of its helping TUE(s)/SUE(s) (in one or more UC groups to check if any helping traffic to arrive).

In other embodiments, given a CUE having a TUE/SUE ID and/or its scrambling ID(s) with a configured/defined UC relationship among them, the transmission data/message (e.g., in PDSCH channel) to the TUE/SUE can be scrambled by the TUE/SUE ID or/and its scrambling ID(s). The DCI CRC can be scrambled by the CUE ID (such as its RNTI) such that the CUE can detect the DCI to get some information of traffic to it. The data/message descrambling process will require detecting based on one or multiple UE IDs and scrambling IDs, one for its own ID or/and its own scrambling ID(s), and (if not for its own) the other(s) trying the TUE/SUE ID(s) or/and its (their) scrambling ID(s), in order to figure out if the traffic is for itself or others (in one or more UC groups).

It is noted that as one operational option, it is possible that when a CUE is helping receive a data or control message transmission from the base station toward a TUE/SUE, and then forwarding a transmission of the data or control message to the TUE/SUE, the TUE/SUE can also receive the data or control transmission from the base station at the same time, which can be optionally combined with the transmission from the CUE for signal detection and decoding as needed.

CUE Selection

To be a CUE, a UE should have a reasonably good channel condition (unless all the nearby UEs are in poor channel conditions) in its Uu link. However, a UE that is very close to the base station may not be an ideal candidate as a CUE, especially from the perspective of UL interference incurrence for a location very close to the base station.

As a CUE in a UC group, the CUE can help forward or relay a packet towards a TUE or a packet from SUE in the UC. The CUE has its own data transmission requirement in the Uu link. A UE with carrier aggregation (CA) or dual connectivity (DC) links with one or more base stations can be an ideal candidate as a CUE. At least one of the CA or DC links can be configured for UC.

Given the scrambled data/message transmission for a UE in Uu (or SL) link, the transmission should be performed in a traffic or control channel, thus the UE has knowledge of the traffic channel or control channel, whose time and frequency resources can be configured semi-statically or dynamically, for example, using high-layer signaling or DCI signaling. For UE cooperation, the time-frequency resources and/or transmissions parameters for DL and/or UL can be pre-configured semi-statically, e.g., via high-layer signaling, or configured dynamically, e.g., via, L1 signaling, for Uu and/or SL. In some embodiments, the resource/parameter configurations between Uu and SL links can be mapped for UC, which means that the resource/parameter configuration in Uu link has a pre-configured or pre-defined relationship with the resource/parameter configuration in SL link (and verse versa for SL configuration to Uu configuration), thus making both CUE(s) and TUE(s)/SUE(s) (in one more UC groups) more readily used for CUE data reception, CUE forwarding/relaying, TUE data reception or SUE data transmission.

In one embodiment, the pre-configured (e.g., by RRC or/and DCI) time-frequency resources in SL and Uu links (optionally with a mapping relationship between SL and Uu links) for one or more UC groups can support a grant-free transmission. In UL, a SUE may choose one or more configured resources in SL link for a data transmission to a CUE (or more CUEs) that may forward/relay data transmission (with a possible processing such as de-scrambling and re-scrambling, or re-do MCS, before sending out) to the base station in the configured resources in Uu link; similarly in DL, a CUE (or more CUEs) may receive a data/message transmission in the Uu link (resources) and forward to a TUE or SUE in the SL link (resources).

Given above descriptions on data/control scrambling and transmission identification for UE cooperation where both Uu and SL are involved, the above proposed data/control scrambling and transmission identification schemes can be directly applied to SL only scenario, where a UE ID can be any SL UE ID such as SL Layer 1 source or destination ID(s), SL MAC layer ID(s), RNTI, and/or SL based group ID, etc. In the SL only scenario, a CUE is simply a transmission UE and a TUE is reception UE in SL.

It should be understood that the above methods can be combined. For example, another embodiment includes the data forwarding and DMRS forwarding. Another embodiment includes data forwarding and SCI. Another embodiment includes data forwarding, DMRS forwarding, and SCI. Corresponding embodiments relate to UE functionality for receiving the described CUE transmissions.

Corresponding embodiments relate to transmission from a SUE to one or more CUEs, and to transmission from one or more CUEs to a base station to forward data, DMRS from an SUE. The options for scrambling described above, for application for CUE to TUE transmission, apply to SUE to CUE transmission. The options for scrambling described above for base station to CUE transmission apply to CUE to base station transmission.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a UE comprising acting as a cooperating UE (CUE) to assist at least one target UE (TUE) by:
   receiving a signal from a base station carrying a first modulated scrambled data block;
   demodulating, de-scrambling and decoding the first modulated scrambled data block to produce a decoded data block;
   determining that the decoded data block is for said at least one TUE;
   encoding the decoded data block to produce an encoded data block, and scrambling the encoded data block based on at least a group identifier (ID) to produce a scrambled data block;
   modulating the scrambled data block to produce a second modulated scrambled data block;
   transmitting the second modulated scrambled data block for reception by the at least one TUE.

2. The method of claim 1 wherein the group ID is a function of one or more of:
   UE cooperation (UC) group ID, TUE sub-group ID, TUE PHY identity, TUE medium access control (MAC) ID, TUE higher-layer ID, CUE sub-group ID, CUE PHY identity, CUE MAC ID, CUE higher-layer ID, cell ID.

3. The method of claim 2, wherein one or more of the following parameters is (or are) predefined, semi-statically configured by higher layer signaling, or dynamically configured by PHY layer signaling:
   UE cooperation (UC) group ID, TUE sub-group ID, TUE PHY identity, TUE medium access control (MAC) ID, TUE higher-layer ID, CUE sub-group ID, CUE PHY identity, CUE MAC ID, CUE higher-layer ID, cell ID.

4. The method of claim 1, wherein the transmitting is a unicast transmission to one TUE, wherein the one TUE is indicated or identified by a TUE sub-group ID or a combination of a UE cooperation (UC) group ID and the TUE sub-group ID.

5. The method of claim 1, wherein the transmitting is a unicast transmission to one TUE, wherein the one TUE is indicated or identified by a DMRS sequence.

6. The method of claim 5, wherein the DMRS sequence is generated based on at least a group ID associated with the unicast transmission.

7. The method of claim 1, wherein the scrambling is also based on a group based data scrambling ID.

8. The method of claim 7, wherein the group based data scrambling ID is:
   based on a configuration of the group based data scrambling ID received via higher layer signalling; or
   based on a cell ID.

9. The method of claim 1 further comprising:
   for unicast transmission to a single TUE, the group ID comprises a UE cooperation group ID (UC group ID) common to all members of the UC group combined with a single TUE sub-group ID; or
   for multicast transmission to a group of TUEs, the group ID comprises a UE cooperation group ID (UC group ID) common to all members of the UC group.

10. The method of claim 1 further comprising:
    receiving signaling to configure the CUE to assist the at least one TUE.

11. The method of claim 1, further comprising:
    transmitting sidelink control information (SCI) signaling indicating transmission resources and parameters for use by the at least one TUE in detecting and decoding second modulated scrambled data block.

12. The method of claim 11 wherein transmitting SCI signaling is performed using a group-cast transmission to one or more UEs in a group of UEs identified by the group ID or a unicast transmission to one TUE.

13. The method of claim 11, wherein transmitting sidelink control information (SCI) signaling further comprises
    scrambling a CRC of a set of sidelink control information (SCI) information bits based on at least the group ID, the SCI information bits and the scrambled CRC together forming an SCI coded block;
    scrambling the SCI coded block based on at least the group ID to produce a scrambled SCI coded block;
    modulating the scrambled SCI coded block to produce a modulated SCI coded block;
    transmitting the modulated SCI coded block for reception by the at least one TUE;
    wherein the group ID is known by the CUE and the at least one target UE (TUE).

14. The method of claim 13 wherein the scrambling the SCI is also based on a group based control scrambling ID.

15. The method of claim 14 wherein the group based control scrambling ID is based on a configuration of the group based control scrambling ID received via higher layer signaling.

16. The method of claim 1 further comprising the UE assisting at least one source UE (SUE), by receiving traffic from the at least one SUE and forwarding the traffic to the base station or another UE.

17. The method of claim 1 wherein determining that the decoded data block is for said at least one TUE comprises attempting to descramble the scrambled data block with a scrambling sequence specific to the CUE, and also with the scrambling sequence based on the group ID.

18. The method of claim 1 wherein the first modulated scrambled data block is scrambled with a different scrambling sequence than the second modulated scrambled data block.

19. The method of claim 1 wherein the first modulated scrambled data block is modulated with a different modulation and coding scheme than the second modulated scrambled data block.

20. The method of claim 1 further comprising: the CUE receiving a first demodulation reference symbol (DMRS) from the base station;
   the CUE determining that the first DMRS is associated with the first modulated scrambled data block transmitted by the base station for reception by the at least one target UE;
   the CUE generating a DMRS based on at least the group ID;
   modulating the DMRS to produce a modulated DMRS;
   transmitting the modulated DMRS for reception by at least one target UE;
   wherein the group ID is known by the UE and the at least one target UE (TUE).

21. The method of claim 1 wherein the UE is one of a group of more than one CUE in a UE group that are assisting the at least one target UE (TUE), wherein the UE group is associated with the group ID.

22. A user equipment (UE) comprising at least a processor and memory, the UE configured to perform the method of claim 1.

* * * * *